United States Patent Office 3,161,099
Patented Dec. 15, 1964

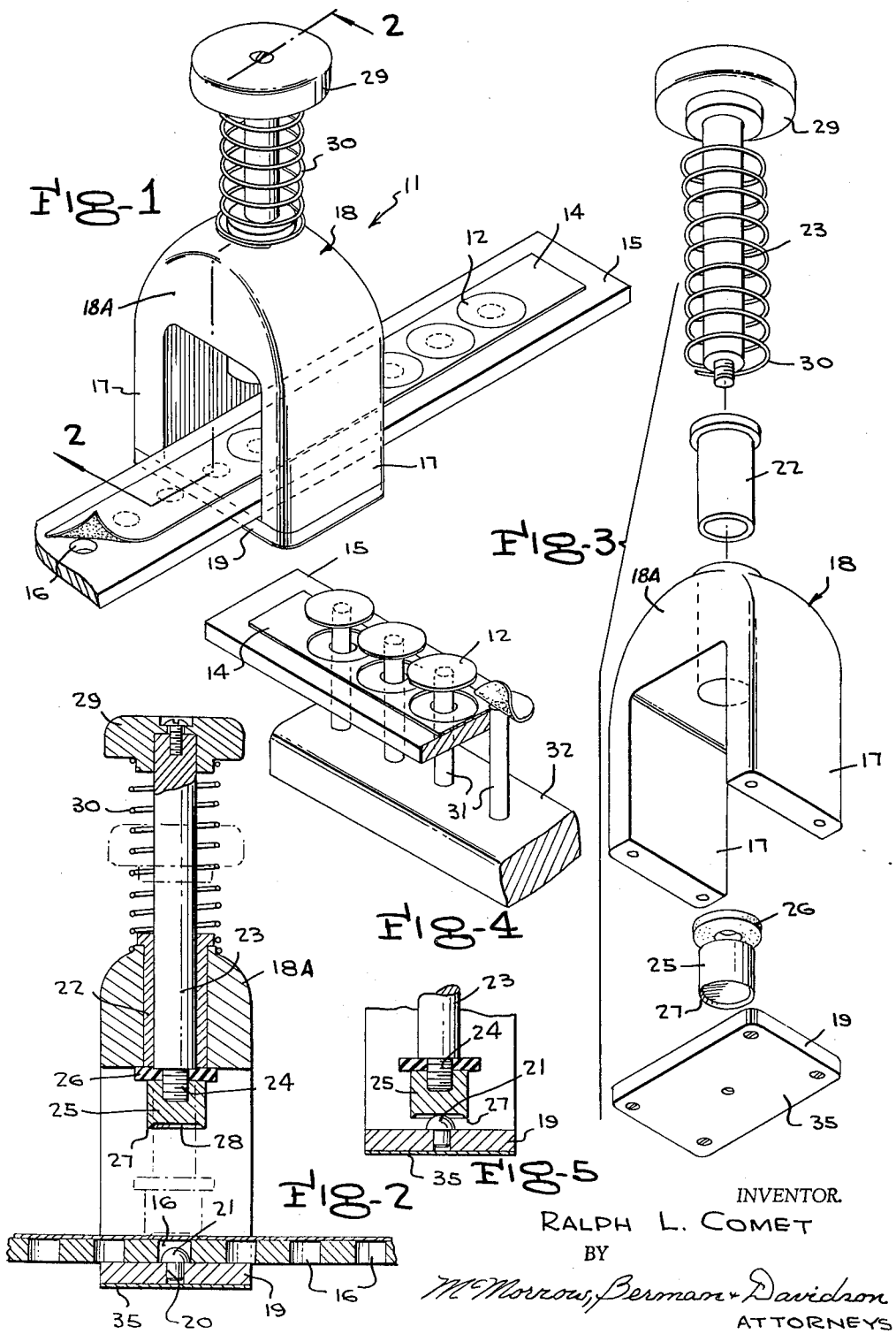

3,161,099
APPARATUS FOR FORMING MASKING TABS
Ralph L. Comet, 14–1B Lloyd Court, Nutley, N.J.
Filed June 5, 1962, Ser. No. 200,229
4 Claims. (Cl. 83—108)

This invention relates to apparatus for forming adhesive masking tabs adapted to be employed for use as protective coverings for products or parts of products during fabrication, handling, repair, storage or shipment, and during operations such as paint spraying, flow coating, dipping, brushing, anodizing and plating, machining, sandblasting, tumbling, and similar operations wherein limited areas must be protected against damage or marring.

A main object of the invention is to provide a novel and improved apparatus for forming masking tabs and for supporting the masking tabs for convenient dispensing thereof, the apparatus being relatively simple in construction, involving inexpensive components, and providing a means of die-cutting masking tabs and preparing said masking tabs for use by arranging them on a support so that they will be easily available for a transfer to a tab-dispensing device.

A further object of the invention is to provide an improved apparatus for die-cutting masking tabs and for supporting the tabs in positions for transfer to mandrels carried on a tab-dispensing member, the apparatus being relatively compact in size, being easy to operate, and providing economic utilization of the blank adhesive material from which the tabs are formed.

Further objects and advantages of the invention will become apparent from the following description and claims, and from the accompanying drawings, wherein:

FIGURE 1 is a fragmentary perspective view of an improved apparatus for forming masking tabs, in accordance with the present invention.

FIGURE 2 is an enlarged vertical cross sectional view taken substantially on the line 2—2 of FIGURE 1.

FIGURE 3 is a perspective view of the tab cutter employed in FIGURES 1 and 2, with the parts thereof shown in separated positions.

FIGURE 4 is a fragmentary perspective view showing the manner in which the tabs formed by the apparatus of the present invention are transferred to the top ends of the upstanding mandrels of a tab dispenser.

FIGURE 5 is a fragmentary vertical cross sectional view taken through the lower portion of the tab cutter of FIGURE 1 with the plunger member in its depressed position, illustrating the manner in which the upstanding projection on the bottom wall of the tape cutter engages in the bottom recess of the cutting die to limit the depression of the die and to thereby protect the peripheral cutting edges thereof.

Referring to the drawings, 11 generally designates an apparatus for forming masking tabs adapted to be employed for use as protective coverings for products or parts of products during various operations such as paint spraying, flow coating, dipping, brushing, anodizing and plating, machining, sandblasting, tumbling, or the like, wherein limited areas must be protected against damage or marring. In the specific apparatus illustrated in the drawings, the tabs, shown at 12, are circular in shape, although it will be readily understood that tabs of any desired shape may be formed by suitably shaping the cutting die employed in the apparatus.

The tabs 12 are formed from a blank 14 comprising an elongated strip of adhesive coated sheet material, such as thin plastic material, or the like, the strip 14 being supported on an elongated flat rigid supporting body 15 which is formed with uniformly spaced, longitudinally aligned apertures 16, the adhesive strip 14 being arranged on the rigid supporting body 15 in overlying relationship with said apertures, for example in the manner illustrated in FIGURE 1. The strip 14 is provided with a coating of tacky adhesive material of conventional composition which holds the strip on the top surface of the elongated flat supporting body 15.

The body 15 is slidably engageable between the spaced vertical legs 17, 17 of a vertical yoke member 18, the yoke member being provided with a plate-like horizontal bottom wall 19, secured to the bottom ends of the legs 17, 17, said bottom wall being formed with a central aperture 20, and a headed pin 21 being rigidly secured in said aperture, defining an upstanding projection engageable in the respective apertures 16, in the manner illustrated in FIGURE 2. Thus, the head of the pin member 21 is of a diameter to substantially fit closely in the aperture 16, whereby the body 15 is held against horizontal movement in a longitudinal direction by its engagement with the head of pin 21 and is substantially restrained against lateral displacement by the slidable engagement of its side edges with the legs 17, 17.

The yoke member 18 is of substantial length in the longitudinal direction of the body 15, so that the body 15 is guided between the legs 17, 17 in transverse overlying relationship to the bottom wall 19.

The top wall or bight 18A of the yoke member 18 is formed with a vertical bore in vertical alignment with the pin 21, said bore being provided with a bearing sleeve 22 in which is slidably engaged a vertical plunger 23. Secured to the bottom end of the plunger, as by being threadedly engaged on a depending stud 24 carried by the plunger is a depending die member 25, an enlarged washer 26 being interposed between the die member 25 and the bottom end of plunger 23, defining stop means limiting upward movement of the plunger 23 in the yoke. The die member 25 is provided with the beveled peripheral bottom edge 27 which converges to define a cutting blade of closed configuration. In the specific embodiment illustrated therein the die member 25 is of cylindrical shape, whereby the depending cutting blade 27 is of circular configuration, namely, is of annular shape. The beveled annular cutting blade 27 thereby defines a recess 28 in the bottom of the die member 25 adapted to receive the substantially hemispherical head of the pin member 21 in the manner illustrated in FIGURE 5, whereby to limit the downward movement of the die member 25 relative to the bottom wall 19 and to thereby prevent inadvertent damage to the depending peripheral cutting blade 27 when the plunger 23 is depressed in the absence of an adhesive strip-bearing support member 15.

Secured to the top end of the plunger member 23 is the enlarged actuating head 29, and surrounding the plunger member is a coiled spring 30, bearing between the head 29 and the top of the yoke member 18, biasing the plunger member 23 upwardly to a position wherein the washer 26 engages the bottom wall surface of the top portion of yoke 18.

In using the apparatus, the support member 15 is engaged between the legs 17, 17 in the manner illustrated in FIGURE 1 with the projection 21 engaged in an aperture 16, which automatically positions the elongated flat supporting body 15 in a proper location for forming a tab 12. Thus, with the body 15 so positioned, the plunger 23 is depressed by exerting a downward impact on the head 29, forcing the die member 25 to descend and causing the blade 27 to penetrate the plastic strip 14, as illustrated in dotted view in FIGURE 2. This cuts a tab 12 and leaves the tab in adherent engagement with the portion of the supporting body 15 surrounding the associated aperture 16.

As is clearly shown in FIGURE 2, the apertures 16 are substantially smaller than the area enclosed by the cutting blade 27 so that substantial portions of the tab 12 are in adherent engagement with the portions of the top surface of body 15 surrounding the apertures 16.

As will be readily apparent, a series of tabs 12 may be rapidly cut on the strip 14 by successively advancing the member 15 through the yoke 18 while consecutively actuating the plunger 23, so that a complete series of tabs 12 may be formed on the body 15 in a relatively short period of time. After the tabs have been cut on one supporting body 15, another supporting body 15 may be quickly inserted into the yoke member 18 and run through the yoke member, employing the procedure above described, with successive reciprocation of the plunger member 23 to successively bring the cutting blade 27 into engagement with the plastic adhesive strip 14 while the supporting body 15 is centered by the engagement of the projection 21 in an aperture 16.

As shown in FIGURE 2, the thickness of the flat supporting body 15 is preferably substantially greater than the height of the upstanding projection 21 so that the projection will be below the level of the top plane of the body 14 and will not interfere with the operation of the die member 25.

As shown in FIGURE 4, after the tabs 12 have been formed on a supporting body 15, the tabs may be dispensed therefrom by engaging the mandrels 31 of a tab dispensing member 32 upwardly through the apertures 16, causing the tabs 12 to engage on the top ends of the upstanding mandrels 31 in positions for easy manual removal. The member 32 merely comprises an elongated bar on which are rigidly secured the evenly spaced upstanding rod-like mandrels 31, the spacing of the mandrels being the same as the spacing between the apertures 16. Thus, a body 15 carrying the die-cut tabs 12 may be merely positioned over the dispensing body 32 with the apertures 16 in alignment with the mandrels, and may then be lowered onto the body 32, leaving the tabs 12 adherently engaged on the top ends of the mandrels 31 in positions for easy manual removal.

A suitable yieldable bottom pad or lining 35 of felt or similar material is preferably secured to the bottom surface of the horizontal bottom wall 19 to prevent damage to a subjacent supporting surface, such as a table, or the like, on which the apparatus is used.

While a specific embodiment of an improved apparatus for forming masking tabs and for supporting the tabs for dispensing thereof has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. Apparatus for forming masking tabs comprising an elongated flat supporting body formed with longitudinally spaced apertures and adapted to receive a strip-shaped blank of tacky adhesive-coated material in overlying relationship to said apertures, a punch body comprising a vertical yoke member and a plate-like bottom wall secured to the bottom of said yoke member, said yoke member being adapted to receive said flat supporting body therein in transverse overlying relation to said bottom wall, a vertically reciprocable plunger slidably mounted in said yoke member perpendicular to said bottom wall, a depending cutting blade of closed configuration secured to the bottom of said plunger, an upstanding projection on said bottom wall vertically aligned with said plunger and engageable in the apertures of said flat supporting body to hold the flat supporting body against horizontal movement while the plunger is moved downwardly to cause said cutting blade to engage the strip-shaped blank, and said projection being engageable by said bottom of said plunger within said blade to prevent said blade from contacting said bottom wall in the absence of said supporting body.

2. Apparatus for forming masking tabs comprising an elongated flat supporting body formed with longitudinally spaced apertures and adapted to receive a strip-shaped blank of tacky adhesive-coated material in overlying relationship to said apertures, a punch body comprising a vertical yoke member and a plate-like bottom wall secured to the bottom of said yoke member, said yoke member being adapted to receive said flat supporting body therein in transverse overlying relation to said bottom wall, a vertically reciprocable plunger slidably mounted in said yoke member perpendicular to said bottom wall, a depending cutting blade of closed configuration secured to the bottom of said plunger, an upstanding projection on said bottom wall vertically aligned with said plunger and engageable in the apertures of said flat supporting body to hold the flat supporting body against horizontal movement while the plunger is moved downwardly to cause said cutting blade to engage the strip-shaped blank, said apertures being substantially smaller than the area enclosed by said cutting blade, whereby the tabs formed by the blade adhere to juxtaposed portions of the flat supporting body surrounding the apertures, and said projection being engageable by said bottom of said plunger within said blade to prevent said blade from contacting said bottom wall in the absence of said supporting body.

3. Apparatus for forming masking tabs comprising an elongated flat supporting body formed with longitudinally spaced apertures and adapted to receive a strip-shaped blank of tacky adhesive-coated material in overlying relationship to said apertures, a punch body comprising a vertical yoke member and a plate-like bottom wall secured to the bottom of said yoke member, said yoke member being adapted to receive said flat supporting body therein in transverse overlying relation to said bottom wall, a vertically reciprocable plunger slidably mounted in said yoke member perpendicular to said bottom wall, a depending cutting blade of closed configuration secured to the bottom of said plunger, an upstanding projection on said bottom wall vertically aligned with said plunger and engageable in the apertures of said flat supporting body to hold the flat supporting body against horizontal movement while the plunger is moved downwardly to cause said cutting blade to engage the strip-shaped blank, said apertures being substantially smaller than the area enclosed by said cutting blade, whereby the tabs formed by the blade adhere to juxtaposed portions of the flat supporting body surrounding the apertures, the thickness of the flat supporting body being substantially greater than the height of said upstanding projection, and said projection being engageable by said bottom of said plunger within said blade to prevent said blade from contacting said bottom wall in the absence of said supporting body.

4. Apparatus for forming masking tabs comprising an elongated flat supporting body formed with longitudinally spaced apertures and adapted to receive a strip-shaped blank of tacky adhesive-coated material in overlying relationship to said apertures, a punch body comprising a vertical yoke member and a plate-like bottom wall secured to the bottom of said yoke member, said yoke member being adapted to receive said flat supporting body therein in transverse overlying relation to said bottom wall, a vertically reciprocable plunger slidably mounted in said yoke member perpendicular to said bottom wall, spring means biasing said plunger upwardly, stop means on the lower end of the plunger engageable with the yoke member to limit upward movement of the plunger, a depending cutting blade of closed configuration secured to the bottom of said plunger, an upstanding projection on said bottom wall vertically aligned with said plunger and engageable in the apertures of said flat supporting body to hold the flat supporting body against horizontal movement while the plunger is moved downwardly to cause said cutting blade to engage the strip-shaped blank, said apertures being substantially smaller than the area enclosed by said cutting blade, whereby the tabs formed by the blade adhere to juxtaposed portions of the flat supporting body surrounding the apertures, the thickness of the flat supporting body being substantially greater than the height of said upstanding projection, and said projection being engageable by said bottom of said plunger within said blade to prevent said blade from contacting said bottom wall in the absence of said supporting body.

References Cited in the file of this patent

UNITED STATES PATENTS

| | | |
|---|---|---|
| 1,779,641 | Rockwood | Oct. 28, 1930 |
| 2,122,368 | Engler | June 28, 1938 |
| 2,245,770 | Franzman | June 17, 1941 |
| 2,479,028 | Stoneham | Aug. 16, 1949 |